United States Patent [19]

Rentzepis

[11] 4,044,252

[45] Aug. 23, 1977

[54] SEPARATION OF CHEMICAL SPECIES

[75] Inventor: Peter Michael Rentzepis, Millington, N.J.

[73] Assignee: Bell Telephone Laboratories, Incorporated, Murray Hill, N.J.

[21] Appl. No.: 538,081

[22] Filed: Jan. 2, 1975

[51] Int. Cl.² .............................................. H01J 39/34
[52] U.S. Cl. ................................. 250/282; 250/423 P
[58] Field of Search .................... 250/423 P, 281, 282; 55/102, 122

[56] References Cited

U.S. PATENT DOCUMENTS

| 3,478,204 | 11/1969 | Brubaker et al. | 250/423 P |
| 3,624,389 | 11/1971 | Cohen et al. | 250/282 |
| 3,772,519 | 11/1973 | Levy et al. | 250/423 P |
| 3,874,858 | 4/1975 | Klugman et al. | 55/122 |

OTHER PUBLICATIONS

"Selective Two-Step (STS) Photoionization of Atoms and Photodissociation of Molecules by Laser Radiation" Ambartzumian et al., Applied Optics, vol. 11 No. 2 Feb. 1972 pp. 354-358.

Primary Examiner—Alfred E. Smith
Assistant Examiner—B. C. Anderson
Attorney, Agent, or Firm—George S. Indig

[57] ABSTRACT

Isotopic separation is accomplished by (1) a second photon irradiation step for selective ionization of a first isotopic species and (2) selective precipitation of a generally immiscible liquid from the saturating vapor phase on the ionized species. The first photon corresponds with a sharply defined spectral portion of the irradiation which exclusively excites the first species to a vibrational level. The second photon further excites this species to its ionization level. Selective precipitation is by coulombic attraction between the ionized species and the vapor. The procedure is applicable to any vapor phase ionizable material.

10 Claims, 1 Drawing Figure

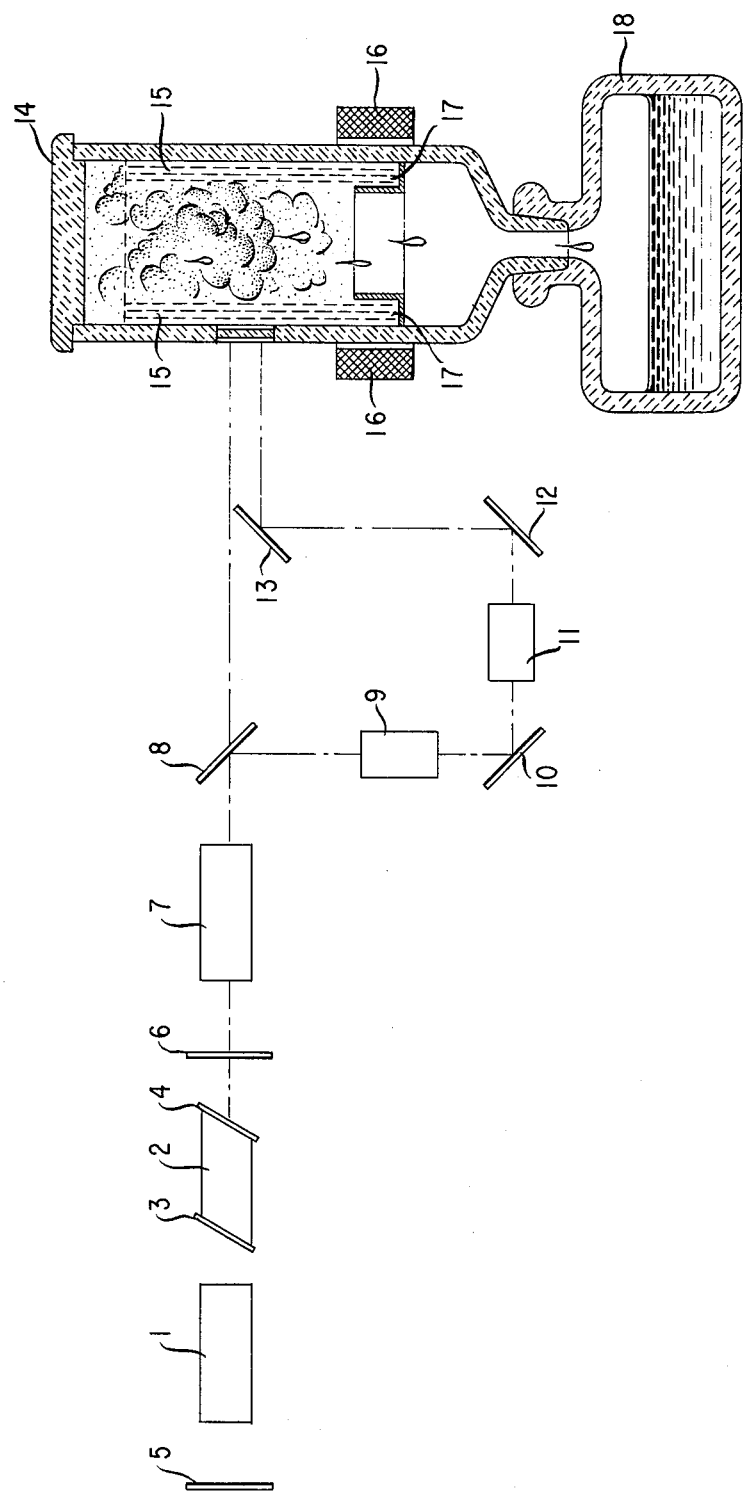

SEPARATION OF CHEMICAL SPECIES

BACKGROUND OF THE INVENTION

1. Field of the Invention

The invention is concerned with isotope separation.

2. Description of the Prior Art

Commonly, separation of isotopic species relies on a difference in size or mobility which is directly related to the atomic weight change due to varying neutron content. Examples include diffusion separation, sometimes aided by increased temperature, centrifugation, etc. In general, separation efficiency has been rather low; and it has been necessary to resort to a number of separation stages. See V. S. Letekhov, 180, Science, pages 451–458 (1973) for a review of such processes.

The development of the laser and associated technology results in the availability of sharply defined radiation wavelengths, and a number of workers have designed separation procedures around the concept of selective absorption. See, for example, U.S. Pat. Nos. 3,443,087 and 3,444,377. Such procedures, which generally rely on electric field separation of selectively excited species have not resulted in efficient separation. Limitations are probably due to the very small differences in absorption levels for different isotopic species, as well as to collision excitation (scrambling) during the final separation stage.

SUMMARY OF THE INVENTION

Closely related species, usualy isotopic species, are separated by a process involving second photon absorption. (For convenience further discussion is in terms of isotopic species.) In the processing condition, the species to be separated are in the vapor state—chemically combined, generally, but not necessarily, with one or more different elements. The vapor is maintained in a ambient which includes another vapor component which is at a saturation or near-saturation level. This other vapor component is preferably, but not necessarily so chosen as to be a non-solvent for the vapor species to be separated.

The first absorption level involves a sharply defined band of radiation of such wavelength as to raise but one of the isotopic species to a vibrational level above the ground state. Such vibrational levels are directly related to mass; and, as a consequence, the compounds, or other combined forms of differing isotopic species, are easily distinguished based on varying atomic weight due to differing neutron content. Excitation to the ionization level (or to a different state involving charge separation e.g., excited state dipole) is next achieved by absorption of radiation of appropriate wavelength by the vibrationally excited species. For pedantic purposes subsequent discussion is in terms of the usual ionized species. This second excitation step which, may involve more than one additional photon generally, but not necessarily, involving a different wavelength of radiation, may proceed either by direct absorption to the ionization level or by autoionization. This latter process results from absorption at some higher level and by subsequent relaxation to the ionization level. The very high selectivity of the ionization of isotopic species—generally, at least 95 percent—is due to the first excitation step. Single photon absorption or even multiphoton absorption not involving vibrational levels, by contrast, are relatively unselective since the ionization level (or dissociation level) is a function of electronic rather than nuclear configuration.

Once selective ionization has been accomplished, final separation results by precipitation of the saturating vapor. This vapor component is attracted to, and precipitates on, ionized material due to coulombic forces. Most effective separation is for the light elements since vibrational levels are most easily distinguished. Vibrational levels for heavy elements with atomic weights even in excess of 200, however, still evidence a variation of at least approximately 0.5 percent. Vibrational level change is greater for isotopes which differ by content of more than 1 neutron per atom.

Where immiscibility is substantially perfect, non-ionized species are not dissolved (are not collected in the precipitating liquid) and separation is excellent.

The final step is collection of the precipitated liquid and removal of the captive isotopic species, perhaps by evaporation.

BRIEF DESCRIPTION OF THE DRAWINGS

The FIGURE is a schematic representation of apparatus suitable for use in the practice of the invention.

DETAILED DESCRIPTION

1. The Drawing

The FIGURE depicts a radiation source 1 which may be a laser—for example, a mode-locked neodymium-YAG laser, a spectral narrowing element 2, which may take the form of a Fabry-Perot with end members 3 and 4 at such Bragg angles as to narrow the spectral bandwidth of the axial portion of the resonating radiation to a desired value. This element, shown as a portion of the laser cavity defined by reflecting members 5 and 6, may alternatively be utilized elsewhere in the apparatus, such, for example, as after element 7. Optional element 7 is depicted as one means of convering a part of the radiation emanating from laser 1 to radiation of a wavelength necessary to satisfy one of the two excitation requirements. Element 7, in accordance with an Example 1, is a water cell equipped with appropriate filters so as to include a prescribed downshifted component in its output. The downshift in energy is due to a Stokes-Raman scattering mechanism. In Example 1, input radiation to element 7 was not highly focused so that output consisted of a series of pronounced emission lines rather than a virtual continuum. In the particular Example, the input from the neodymium-YAG mode-locked laser 1 was at 9431 cm$^{-1}$, and the line permitted to pass through element 7 was at 6431 cm$^{-1}$ (together with some unconverted radiation). Mirror 8, again, merely an illustrative element, is designed to pass, for example, downshifted component from element 7 while reflecting unconverted radiation from element 1. Optional elements 9 and 11 are nonlinear devices, for example, of such design as to be essentially noncritically phase matched for the second or higher harmonic of the unconverted radiation. For Example 1, element 9 is a crystal of potassium-dihydrogen-phosphate (KDP) producing a second harmonic (from the Nd-YAG output) of 5300 Angstrom units or 18862 cm$^{-1}$. In this example, output from element 9 is totally reflected by mirror 10 so as to enter redoubling element 11. For Example 1, element 11 is constructed of a crystal of ammonium-dihydrogen-phosphate (ADP) producing a second harmonic of 2650 Angstrom units or about 37724 cm$^{-1}$. Elements 9 and 11 may be provided with filters to pass only the generated second harmonic. Reflecting mirrors 12 and 13 serve to direct the redoubled output of element 11 into vessel 14 into which the downshifted Raman output of element 7 is also introduced. Vessel 14 contains a vapor mixture of isotopic species to be separated. Liner 15, possibly provided with heating means 16, is a receptacle for vapor component 17 with which the ambient within vessel 14 is to be saturated. In Example 1, this component 17 is a light machine oil. Liner 15 is apertured so as to permit vapor phase componet 17 to enter the main volume defined by vessel 14. Final separation of droplets perferentially nucleated by ionized isotopic species may be in a container, such as, 18.

The FIGURE is largely by way of example with several of the elements being designed to accomplish the requisite shifting for particular laser 1 assuming a specific isotopic mixture. The particular wave numbers noted are for Example 1 which is concerned with separation of $Cl^{35}$ from $Cl^{37}$.

2. Processing Considerations

The separation process has been applied to a variety of isotopic mixtures. Particular photon energy values were sometimes chosen with a view to expediency. It has been noted that the efficacy of the process depends on the ease with which corresponding vibratinal levels maybe differentiated. This discrimination is based on the fact that, to the first approximation, the first excited vibrational level is directly proportional to mass. Discrimination is adequate for higher vibrational levels, particularly for lighter elements; and so in Example 1, the selected downshifted line from the water cell was absorbed at a second vibrational level of $Cl^{35}$. Selectivity for the inventive process is dependent upon the selective energization of the selected isotopic species to a vibrational level. Vibrational levels for indicated members of isotopic pairs are set forth in the Table.

In general, lifetimes of the vibrational levels are of the orders of milliseconds so that some ionization via the prescribed second photon process results with moderate powers. Rate of isotope separation, however, increases with power, roughly linearly so that higher powers, both at the first and second photon levels, are useful. Example 1 was conducted with a Nd-YAG mode-locked laser emitting pulses of approximately 10 picoseconds duration spaced approximately 6 nanoseconds apart with peak powers of approximately $5 \times 10^9$ watts. The arrangement there described, resulting in first photon energy at peak power of about $10^9$ watts and second photon energy at about $10^8$ watts results in production of $Cl^{35}$ with an efficiency of approximately 95 percent.

Efficiency of separation is, as expected, also dependent upon isotopic concentration in the vapor. Most effective energy utilization requires near total absorption within the cell in which separation is taking place. For Example 1, a vapor concentration of total $HCl^{35}$-$HCl^{37}$ of $3 \times 10^{18}$ molecules/cm³ for a cell dimension in the beam direction of approximately 10 cm was utilized. This content represented 75.53 percent $HCl^{35}$ expressed as a percent of the total HCl mixture.

Retain energization to the ionization level is less critical. Line width may be considerably broader than that of the radiation used to attain the vibrational level. The permitted spectral width is for a minimum value required to just meet the required energy level difference between the attained vibrational level and the ionization level on the one hand, and the value just below that required to attain an ionization level by a single photon process. In Example 1, this range is from 4080 cm$^{-1}$ to 100,000 cm$^{-1}$. Upper levels within this range result in population of an ionization level through the process known as autoionization.

Whereas some slight selectivity is possible through accurate control of the energy quantum used to attain the ionization level, it is the major thrust of this aspect of the invention that selectivity is best achieved at the vibrational level. By appropriate choice of the first quantum level, it is possible to selectively excite either (or any) isotopic species. Even here, there is a preference, however, for selection of that species having the lower level of the appropriate vibrational level pair, since this choice prevents any inadvertent energization of the other isotopic species (selection of the higher member of corresponding vibrational levels may permit some energization of the lower engery member through a relaxation process).

Vibrational and ionization levels of illustrative isotopes are set forth in the Table.

| Isotope | (%) Natural Abundance | Compound | Vibrational Energy of Compound (cm$^{-1}$) | (cm$^{-1}$) $\Delta E_v$ (Change in $V_E$) | Ionization Potential (ev) |
|---|---|---|---|---|---|
| $H^1$ | 99.985 | $H_2^1O$ | 1595 — 3651.7 | 762.4 | 12.50 |
| $H^2(D)$ | 0.015 | $H_2^2O$ | 1178.7 — 2666 | 985.7 | 12.51 |
| $Cl^{35}$ | 75.53 | $HCl^{35}$ | 2886 | 795 | 12.78 |
| $Cl^{37}$ | 24.47 | $HCl^{37}$ | 2091 | | 12.78 |
| $B^{10}$ | 19.6 | $B^{10}F_3$ | 482 — 1497.0 | 2 | 12.5 |
| $B^{11}$ | 80.4 | $B^{11}F_3$ | 480 — 1445.9 | 41.1 | 12.5(1) |
| $U^{235}$ | 0.72 | $U^{235}F_6$ | 623 — 2053 | 0.4 | ~14.5 |
| $U^{238}$ | 99.27 | $U^{238}F_6$ | 623.4 — 2054.6 | 1.6 | ~14.5 |
| $N^{14}$ | 99.63 | $N^{14}O$ | 1876.11 | 33.07 | 9.25 |
| $N^{15}$ | 0.37 | $N^{15}O$ | 1843.04 | | 9.25 |
| $C^{12}$ | 98.89 | $C^{12}O$ | 2143.16 | 47.09 | |
| $C^{13}$ | 1.11 | $C^{13}O$ | 2096.07 | | 14 |

-continued

| Isotope | (%) Natural Abundance | Compound | Vibrational Energy of Compound (cm$^{-1}$) | (cm$^{-1}$) $\Delta E_v$ (Change in $V_E$) | Ionization Potential (ev) |
|---|---|---|---|---|---|
| $B_2^{79}$ | 30.54 | $HB_2^{79}$ | 2558.76 | | |
| | | | | −0.36 | 12.09 |
| $B_2^{81}$ | 49.46 | $HB_7^{81}$ | 2558.40 | | |

It is a general requirement for higher efficiency that the liquid precipitant be a non-solvent for any isotopic vapor species in non-ionized form. Any substantial solubility results in dissolution of non-ionized species (i.e., that is, in self-ionization) and reduces separation efficiency. Useful precipitant materials are non-ionizable—i.e., covalently bonded hydrocarbons.

3. Examples

EXAMPLE 1

The following describes the separation of a 7553-24.47 percent mixture of HCl$^{35}$–HCl$^{37}$: a one gram mixture in liquid state is placed in a glass vessel of approximate capacity 100 cm$^3$ which is provided with an inner container of a hydrocarbon precipitant parafinic hydrocarbon, also in the liquid state. The precipitant is a light machine oil of approximate molecular weight 100. The inner container is provided with a resistive heating jacket. The vessel is evacuated to 10$^{-7}$ mm/Hg and the inner container is heated to saturate the major volume of the vessle with oil. Since HCl has a reasonable vapor pressure, it is unnecessary to heat his isotopic mixture. A beam including a 9431 cm$^{-1}$ component together with a 37724 cm$^{-1}$ is produced from an Nd-YAG laser mode locked by means of a self-bleaching dye to produce pulses of duration of approximately 100 picoseconds at a peak power of about 5 gigawatts separated by 6 nanosecond intervals. A Fabry-Perot at approximate angle to the axis of the laser cavity is utilized to reduce the line width to approximately ±20 cm$^{-1}$. Resulting output is introduced into a water cell provided with filters designed to pass fundamental Nd—YAG radiation at 9431 cm$^{-1}$ together with radiation corresponding with a downshifted Stokes-Raman line at 6431 cm$^{-1}$. The latter is introduced directly into the vessel, while the former is passed though two successive SHG elements—the first, KDP; the second, ADP—so as to result in the redoubled energy at 2650 Angstrom units or 37724 cm$^{-1}$. Droplets are observed to form in the vessel, and these are collected at a rate of about 10 ml/minute. The HCl is separated from the oil by distilling with a yield of 99.9 percent.

EXAMPLE 2

U$^{235}$ may be separated from U$^{238}$ in accordance with the following procedure. The procedure involves separation of the volatile compound U$^{235}$F$_6$ from U$^{238}$F$_6$. A vibrational level of the U$^{235}$ compound is excited by radiation at 2053 cm$^{-1}$. The corresponding U$^{238}$F$_6$ level is 1.6 cm$^{-1}$ higher (2054.6 cm$^{-1}$). Use is made of a Raman-shifted Nd-YAG laser operating at a center frequency of 2053 cm$^{-1}$. Operation with a laser bandwidth of 1.5 cm$^{-1}$ or less assures selectivity. Simultaneous irradiation by a UV laser emitting radiation at a wavelength of 0.8776 M$\mu$ selectively raises the vibrationally excited U$^{235}$F$_6$ is the first ionization level. The ionization potential for U$^{235}$F$_6$ is 14.5 eV which is very close to the slightly higher value of U$^{238}$F$_6$ (about 14.51 eV). Selectively, in accordance with the general teachings of the invention, is facilitated by initial excitation of the desired isotopic compound to a vibrational energy level corresponding to about 2000 cm$^{(1}$ so that the bandwidth requirement for selective ionization is reduced to a permitted width of about 4000 cm$^{(1}$ by the two-step process.

Separation is accomplished in the equipment shown in the FIGURE by use of a saturated atmosphere—in this instance, of machine oil—which selectively precipitates on the selectively ionized U$^{235}$F$_6$ due to coulombic forces. In accordance with the preferred embodiment of the invention, the selection of machine oil as the saturating atmospheric fluid minimizes unwanted dissolution of unionized U$^{238}$F$_6$.

What is claimed is:

1. Process for species separation in accordance with which a vapor containing at least two different species is irradiated so as to electronically excite but one selected species and is separated by use of an agent which has a preferential coulombic attraction for the excited species, characterized in that the said vapor is irradiated by radiation which includes a sharply defined spectral portion for exciting the selected species to an elevated vibrational state and a portion for electronically raising the energy level of the selected species in the elevated vibrational state to an electronically elevated level in which electronic charges are separated, and in that the ambient atmosphere is substantially saturated with respect to said agent, which is a condensable vapor which is substantially a non-solvent for any included isotopic species which is not in an electrically elevated level in which electronic charges are separated, whereby the selected species serves as nucleation sites for the said condensable vapor so that the selected species selectively precipitates at such sites.

2. The process of claim 1 in which the said species are isotopic species of the same element.

3. The process of claim 2 in which the said species are in chemically combined form.

4. The process of claim 3 in which the said chemically combined form is an ionic compound.

5. The process of claim 1 in which the said electronically elevated level is an ionization level.

6. The process of claim 1 in which the said electronically elevated level corresponds with an excited state dipole.

7. The process of claim 1 in which the said electronically elevated level of the excited species to be separated is at a quantum level below that of other species.

8. The process of claim 1 in which the said electronically elevated level is an ion level and in which ionization proceeds by autoionization.

9. The process of claim 1 in which the said species are isotopic species of chlorine.

10. The process of claim 1 in which the said species are isotopic species of hydrogen.

* * * * *

UNITED STATES PATENT AND TRADEMARK OFFICE
CERTIFICATE OF CORRECTION

PATENT NO. : 4,044,252

DATED : August 23, 1977

INVENTOR(S) : Peter Michael Rentzepis

It is certified that error appears in the above-identified patent and that said Letters Patent are hereby corrected as shown below:

In the Detailed Description, Column 2, line 37, "convering" should read --converting--. In the Table beneath Columns 3 and 4, "12.78" appearing on line 6, Column 6 should read --12.782--. In Example 1, Column 5, line 30, "his" should read --this--. In Example 2, line 60, "$cm^{1}$" should read --$cm^{-1}$--; line 62, "0.8776 M$\mu$" should read --0.08776 $\mu$m--; line 63, "is" should read --to--; and line 65, last word "Selectively" should read --Selectivity--. In Column 6, line 12, "2000 $cm^{1}$" should read --2000 $cm^{-1}$--; line 14, "4000 $cm^{1}$" should read --4000 $cm^{-1}$--; and line 39, "electrically" should read --electronically--.

In the Detailed Description, beneath Columns 3 and 4, "762.4" appearing on the 3rd line of the 5th Column should read --416.3--.

Signed and Sealed this

Twenty-first Day of November 1978

[SEAL]

Attest:

RUTH C. MASON
Attesting Officer

DONALD W. BANNER
Commissioner of Patents and Trademarks